United States Patent
Doherty et al.

(10) Patent No.: US 10,913,258 B2
(45) Date of Patent: Feb. 9, 2021

(54) METHOD AND SYSTEM FOR PROVIDING THERMAL SUPPORT IN AN ADDITIVE MANUFACTURING PROCESS

(71) Applicant: United Technologies Corporation, Hartford, CT (US)

(72) Inventors: Adam Z. Doherty, Manchester, CT (US); Christopher F. O'Neill, Hebron, CT (US); John P. Rizzo, Jr., Vernon, CT (US)

(73) Assignee: Raytheon Technologies Corporation, Farmington, CT (US)

(*) Notice: Subject to any disclaimer, the term of this patent is extended or adjusted under 35 U.S.C. 154(b) by 1592 days.

(21) Appl. No.: 14/611,580

(22) Filed: Feb. 2, 2015

(65) Prior Publication Data

US 2016/0221264 A1    Aug. 4, 2016

(51) Int. Cl.
| | |
|---|---|
| B33Y 10/00 | (2015.01) |
| B22F 3/105 | (2006.01) |
| B33Y 30/00 | (2015.01) |
| B29C 64/40 | (2017.01) |
| B29C 64/153 | (2017.01) |
| B29L 31/00 | (2006.01) |

(52) U.S. Cl.
CPC ............ *B33Y 30/00* (2014.12); *B22F 3/1055* (2013.01); *B29C 64/153* (2017.08); *B29C 64/40* (2017.08); *B33Y 10/00* (2014.12); *B22F 2003/1058* (2013.01); *B29L 2031/757* (2013.01); *Y02P 10/25* (2015.11)

(58) Field of Classification Search
CPC . B22F 3/1055; B22F 2003/1058; B33Y 10/00
See application file for complete search history.

(56) References Cited

U.S. PATENT DOCUMENTS

| | | | |
|---|---|---|---|
| 7,521,652 B2 * | 4/2009 | Chung | B22F 3/1028 |
| | | | 219/121.84 |
| 2010/0298065 A1 | 11/2010 | Soracco et al. | |
| 2013/0112366 A1 | 5/2013 | Mottin et al. | |
| 2013/0140741 A1 | 6/2013 | El-Siblani et al. | |
| 2014/0335313 A1 | 11/2014 | Chou et al. | |

FOREIGN PATENT DOCUMENTS

| | | | | |
|---|---|---|---|---|
| EP | 1669143 A1 | 6/2006 | | |
| GB | 2515287 A | * 12/2014 | ............ | B22F 3/1055 |
| WO | 2012054099 | 4/2012 | | |
| WO | 2013174449 | 11/2013 | | |
| WO | 2014074954 | 5/2014 | | |

OTHER PUBLICATIONS

European Search Report for European Application No. 16153850.9 completed Jun. 27, 2016.
Summons to Oral Proceedings for European Patent Application No. 16153850.9 dated Aug. 26, 2020.
Gong, Xibing et al., Review on powder-based electron beam additive manufacturing technology, Manufacturing Review, vol. 1, Jan. 1, 2014, p. 2.

* cited by examiner

*Primary Examiner* — Vanessa T. Luk
(74) *Attorney, Agent, or Firm* — Carlson, Gaskey & Olds, P.C.

(57) ABSTRACT

An additive manufacturing process includes simultaneously constructing a component and a non-contacting thermal support for the component. The non-contacting thermal support includes a three dimensional negative of the component. The non-contacting thermal support transfers heat from the component into a heat sink.

6 Claims, 3 Drawing Sheets

METHOD AND SYSTEM FOR PROVIDING THERMAL SUPPORT IN AN ADDITIVE MANUFACTURING PROCESS

TECHNICAL FIELD

The present disclosure relates generally to additive manufacturing processes, and more specifically to a method and system for providing non-contacting thermal support to a component during an additive manufacturing process.

BACKGROUND

Additive manufacturing systems create three dimensional structures, or components, by applying sequential layers of a material to a base surface. The three dimensional shape of the structure depends on the specific dimensions of each layer. Some additive manufacturing systems, such as direct metal laser sintering, require thermal and structural supports to support the structure being created during the additive manufacturing process. By way of example, certain structures can be imbalanced in a final form, and require a structural support to prevent the structure being created from shifting or falling during assembly. Similarly, the assembly process can have high temperatures that require a thermal pathway between the structure being created and a corresponding heat sink. The large numbers of fine particles included in the powders utilized in additive manufacturing processes result in a thermal conductivity orders of magnitude lower than the solid material of the structure being assembled due the sum of thousands of contact resistances. Due to the thermal conductivity of the structural and thermal support, a solid thermal path is provided connecting the structure to the heat sink.

In order to create the structural and thermal supports, current additive manufacturing systems create a honeycomb, or lattice, support connecting surfaces of the structure being assembled to the base and to a heat sink. The honeycomb support provides structural support to maintain the structure in position during the manufacturing process. The honeycomb support further provides thermal support by providing an efficient thermal pathway from the structure being assembled to the base, which operates as a heat sync. The existing honeycomb structural and thermal supports are integral to the structure being assembled. Once the structure has been completed, the honeycomb support must be decoupled from the assembled structure using milling or another material removal process in a finishing step.

SUMMARY OF THE INVENTION

In one exemplary embodiment, an additive manufacturing process includes simultaneously constructing a component and a non-contacting thermal support for the component, wherein the non-contacting thermal support includes a three dimensional negative of the component, and dissipating heat from the component through the non-contacting thermal support to a heat sink.

In a further example of the above exemplary embodiment dissipating heat from the component through the non-contacting thermal support to a heat sink includes providing a thermal passage across a gap defined between the non-contacting thermal support and the component.

A further embodiment of any of the above exemplary embodiments includes constructing the thermal support as a solid component.

A further embodiment of any of the above exemplary embodiments includes constructing the thermal support as a thermally conductive wall supported by a structural support.

In a further example of any of the above exemplary embodiments, simultaneously constructing a component and a non-contacting thermal support for the component includes defining a gap between the component and the non-contacting surface.

In a further example of any of the above exemplary embodiments, the gap is in the range of about three to five times an average particle size of a powder particle utilized in the additive manufacturing process.

In a further example of any of the above exemplary embodiments, simultaneously constructing a component and a non-contacting thermal support for the component comprises constructing at least one downward facing surface of the component and at least one upward facing surface of the non-contacting thermal support, and wherein the at least one downward facing surface is opposite the at least one upward facing surface across the gap.

A further embodiment of any of the above exemplary embodiments includes removing the component from the non-contacting thermal support without mechanically altering the non-contacting thermal support and without chemically altering the non-contacting thermal support.

In a further example of any of the above exemplary embodiments, simultaneously constructing a component and a non-contacting thermal support for the component includes constructing each of the component and the non-contacting thermal support using a direct metal laser sintering process.

In one exemplary embodiment, an additive manufacturing process includes dissipating heat from at least one inaccessible downward facing surface of a component being assembled through a corresponding upward facing surface of a non-contacting thermal support.

In a further example of the above exemplary embodiment, the at least one inaccessible downward facing surface includes a finish absent heat artifacts.

In a further example of any of the above exemplary embodiments, the non-contacting thermal support defines an at least partial three dimensional negative image of the component being assembled and wherein the component being assembled is positioned at least partially within the at least partial three dimensional negative image.

A further embodiment of any of the above exemplary embodiments includes defining a gap between the non-contacting thermal support and at least one surface of the component, the gap being in the range of about three to five times an average particle size of a powder used in the additive manufacturing process.

In a further example of any of the above exemplary embodiments, dissipating heat from at least one inaccessible downward facing surface of a component being assembled through a corresponding upward facing surface of a non-contacting thermal support comprises dissipating heat across the gap into the non-contacting thermal support.

A further embodiment of any of the above exemplary embodiments includes determining dimensions of the non-contacting thermal support based on received dimensions of the component using a controller.

In another exemplary embodiment, a non-contacting thermal support for an additively manufactured component includes an interior surface defining an at least partial three dimensional negative image of a component, and the at least partial three dimensional negative image including at least one upwards facing surface configured to provide a thermal path from a corresponding inaccessible downward facing surface to a heat sink.

In a further example of the above exemplary embodiment the at least partial three dimensional negative image is configured to define a gap between the non-contacting thermal support and a component.

In a further example of any of the above exemplary embodiments the gap has a width in the range of about three to five times an average particle size of an additive manufacturing powder particle.

In a further example of any of the above exemplary embodiments the non-contacting thermal support is a direct metal laser sintered thermal support.

In a further example of any of the above exemplary embodiments the at least partial three dimensional negative image is defined by a wall, and wherein the wall is structurally supported by an integral structural and thermal support.

These and other features of the present invention can be best understood from the following specification and drawings, the following of which is a brief description.

DETAILED DESCRIPTION OF AN EMBODIMENT

Additive manufacturing techniques, such as the aforementioned direct metal laser sintering process, utilize honeycomb support structures created integrally with a component being assembled to physically and thermally support the component being assembled. Certain components, particularly components whose center of gravity is aligned with a steady base, do not require the physical support features of the existing honeycomb support structures. In yet further such examples, the component can include one or more undercuts (alternately referred to as downward facing surfaces) in difficult to reach areas of the component.

Removal of an integral support structure using milling, or other material removal techniques, at the downward facing surfaces can be difficult and expensive. In further examples, downward facing surfaces can be present where milling or other removal techniques are not adequate to reach the surface and remove the support. Surfaces of this type are referred to as inaccessible downward facing surfaces. As a result, the previously utilized honeycomb support structure can be inadequate for utilization in the assembly of certain structures.

Figure 1:
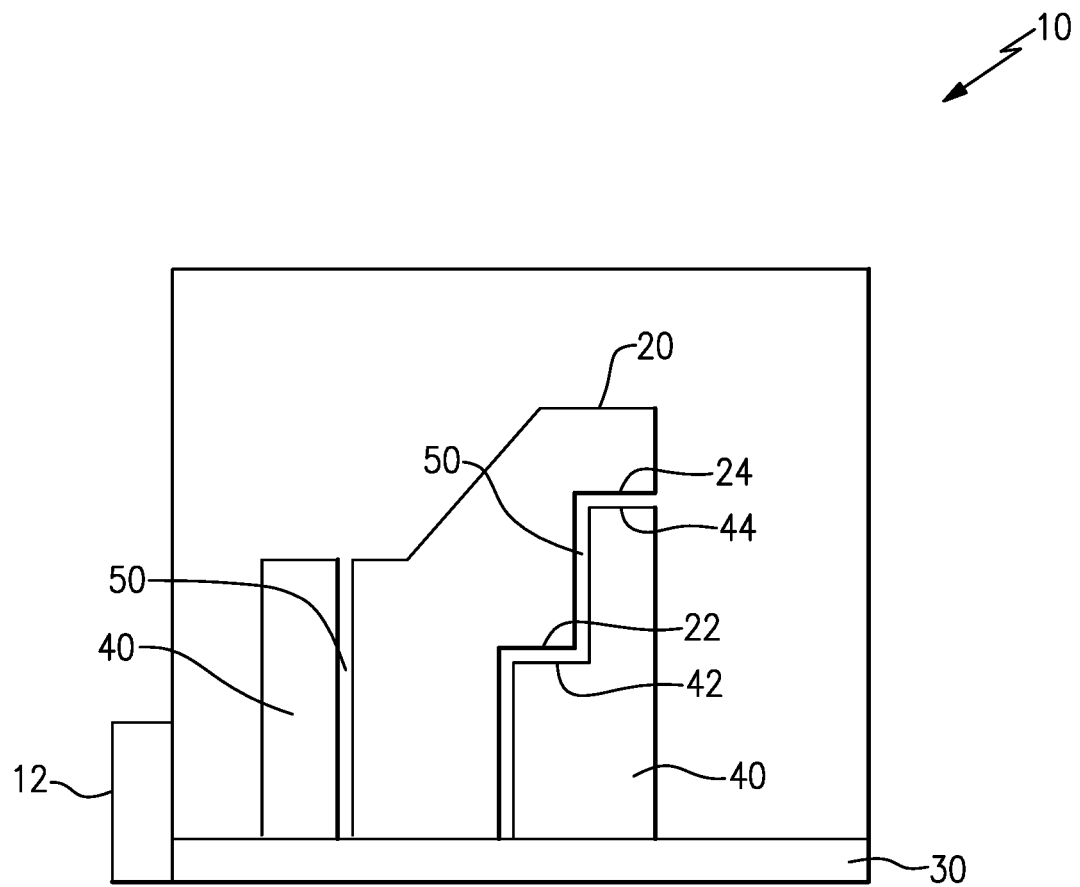
FIG. 1 schematically illustrates an additive manufacturing machine using a direct metal laser sintering process.

FIG. 1 schematically illustrates an additive manufacturing machine 10 that has constructed a component 20 using a direct metal laser sintering process. The component 20 includes multiple downward facing surfaces 22, 24, and is constructed in a manner such that the component 20 will not shift or fall during assembly. As a result, no structural support is needed during the additive manufacturing process. Due to the positioning of the downward facing surfaces 22, 24, mechanical or chemical removal of an integral support structure from the downward facing surfaces 22, 24 is expensive or impossible. As such, the downward facing surfaces 22, 24, are inaccessible downward facing surfaces. Due to the high temperatures of the additive manufacturing process, a thermal support providing a thermal pathway between downward facing surfaces 22, 24 and a heat sink included in a base 30 is still required. Existing systems omit the thermal and structural support due to the inaccessibility of the downward facing surfaces. As a result of the omission, rough protrusions and intrusions can occur at the surface resulting in an increased surface roughness. The increased surface roughness's are referred to herein as heat artifacts.

The additive manufacturing machine 10 includes a controller 12 that controls operations of the additive manufacturing machine 10. In some examples the controller 12 can be built into the machine 10 as a component of the machine 10. In other examples, the controller 12 can be a computer, or other processing device, connected to a control port of the additive manufacturing machine 10.

In order to prevent unnecessary milling, or other part removal, a thermal non-contacting thermal support 40 is constructed by the additive manufacturing machine 10 simultaneously with the construction of the component 20. A non-contacting thermal support is defined herein as a thermal support structure which maintains thermal conductivity with a component being assembled without a physical contact with, or a physical connection to, the component 20. The non-contacting thermal support 40 includes a pair of upward facing surfaces 42, 44, each of which directly faces one of the inaccessible downward facing surfaces 22, 24 of the component 20.

The non-contacting thermal support 40 essentially surrounds the component 20 and includes a three dimensional negative image of the component 20. The three dimensional negative image of the component 20 is offset from the component in each dimension, thereby defining a small gap 50 between the component 20 and the non-contacting thermal support 40. In the illustrated example of FIG. 1, the gap 50 is enlarged for illustrative purposes. In a practical embodiment, the gap 50 can be as small as the width of about three to five average sized particles of the laser sintering powder.

By way of example, a typical laser sintering powder includes particles that are approximately 0.04 mm (0.0015 inches) in diameter. In such an example, the gap 50 is in the range of about 0.1 to 0.3 mm (0.004-0.012 inches). Including a gap of the described size range provides sufficient room for the component 20 to be removed from the thermal support after completion of the assembly process. By making the gap 50 slightly larger than the average particle size, particles in the laser sintering powder are allowed to flow freely during the manufacturing process.

Further, due to the restricted gap size, there is a relatively small number of contact resistances arising across the gap 50, and the thermal resistance of the gap is such that effective heat transfer can occur across the gap 50. As such, an adequate thermal pathway is provided across the gap 50 into the non-contacting thermal support 40. The non-contacting thermal support 40 provides a thermal pathway to a heat sink in the base 30. In this way, low stress and difficult to machine portions of the component 20 can dissipate heat across the gap 50 and through the non-contacting thermal support 40 during the laser sintering, or other additive manufacturing process, without requiring a direct contact between the non-contacting thermal support 40 and the component 20. The dissipation of heat in this manner prevents or minimizes the formation of heat artifacts on the surfaces of the component 20 facing the gap 50. In alternate embodiments, the heat sink can be distinct from the base 30, and the non-contacting thermal support 40 includes a direct contact with the distinct heat sink in addition to the base 30.

While the above example is described with regards to a direct metal laser sintering process, one of skill in the art having the benefit of this disclosure will appreciate that the illustrated thermal non-contacting thermal support 40 can be utilized in conjunction with other additive manufacturing techniques, and is not limited to a direct metal laser sintering technique.

Figure 2A:
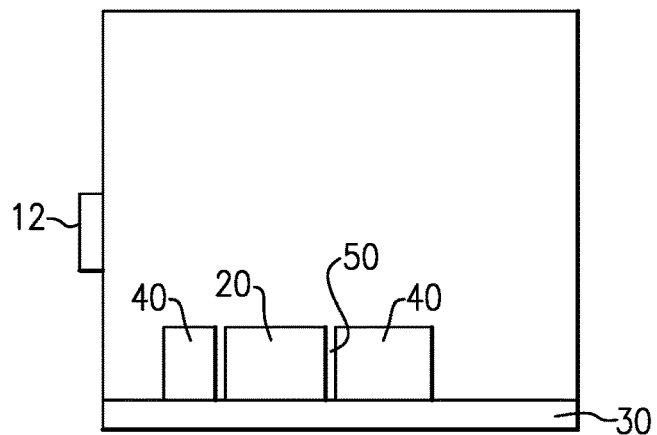
FIG. 2A schematically illustrates an early step in an additive manufacturing process.
Figure 2B:
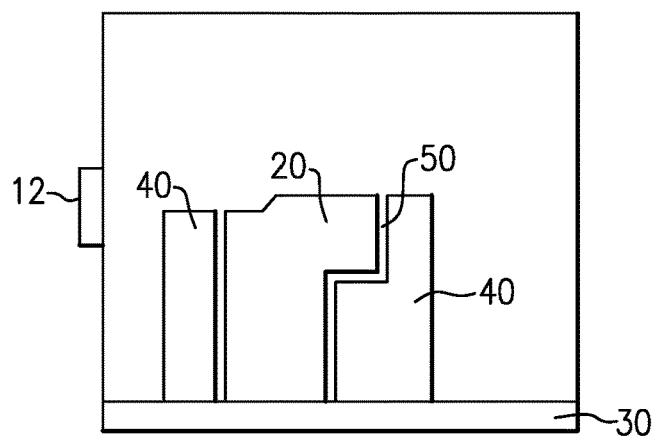
FIG. 2B schematically illustrates a middle step in an additive manufacturing process.
Figure 2C:
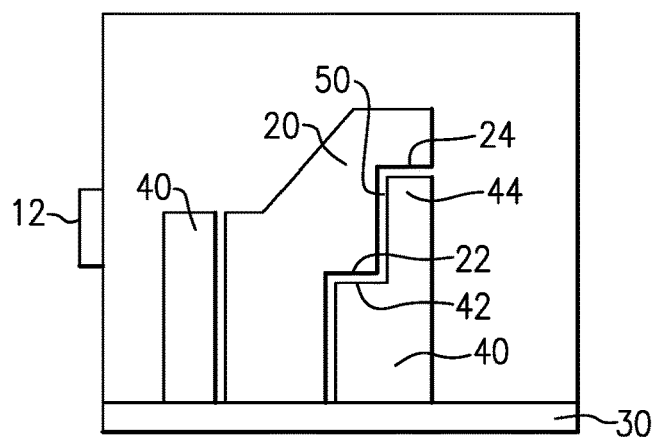
FIG. 2C schematically illustrates late step in an additive manufacturing process.

With continued reference to FIG. 1, and with like numerals indicating like elements, FIGS. 2A, 2B and 2C illustrate individual steps in the additive manufacturing technique described above. FIG. 2A illustrates an early step, FIG. 2B illustrates a middle step, and FIG. 2C illustrates a late step in the additive manufacturing process. As can be seen, the non-contacting thermal support 40 is constructed simultaneously with the component 20, with the gap 50 being defined throughout the assembly process. By constructing the non-contacting thermal support 40 simultaneously with the component 20, the laser sintering powder is not inhibited for the formation of the component 20, but a thermal pathway is maintained between the component 20 and the base 30.

In alternative examples, the non-contacting thermal support 40 can be referred to as a mold, or a partial mold, because the non-contacting thermal support 40 includes a three dimensional negative image of the component 20 once the additive manufacturing process has been completed. As a result of the mold shape, the resulting component 20 can be easily removed from the mold by hand, with minimal finishing steps required to place the component 20 in a completed state. The resulting surfaces where the component 20 faced the non-contacting thermal support 40, such as the downward facing surfaces 42, 44, have an improved surface finish, relative to components 20 constructed using the previous honeycomb support structure. By way of example, the resulting surfaces have less roughness, and can be more exactly manufactured than the components constructed with a honeycomb support structure. Further, inaccessible downward facing surfaces of the component 20 include significantly less heat artifacts than components created using the existing thermal and structural supports.

With continued reference to FIGS. 1-2C, FIG. 3 schematically illustrates an alternate example additive manufacturing machine 110 that has constructed a component 120 using direct metal laser sintering. As with the exemplary additive manufacturing machine 10 of FIG. 1, the component 120 includes multiple downward facing surfaces 122, 124, and a non-contacting thermal support structure 140 is constructed simultaneously with the component 120. The non-contacting thermal support 140 is structured forms the mold, or partial mold, portion using a thin wall 141 of solid material. The thin wall 141 is structurally supported using the aforementioned honeycomb structural support 143 system, or any similar means for structurally supporting the thin wall 141.

Figure 3:
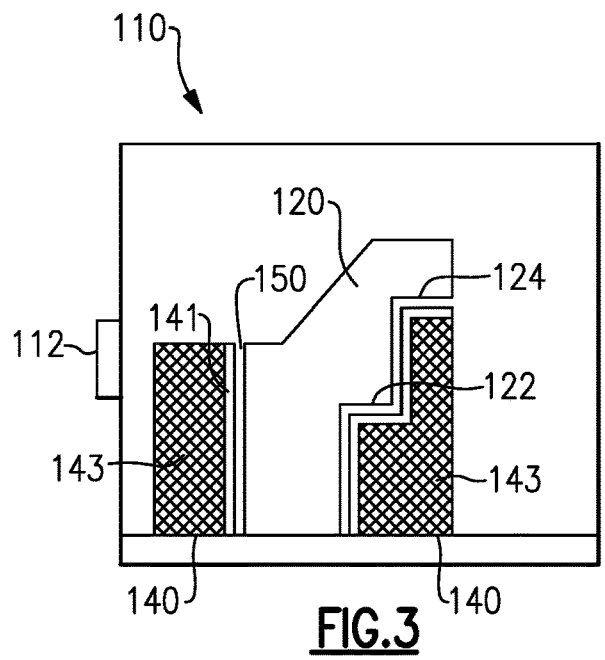
FIG. 3 illustrates an alternate example additive manufacturing machine that has constructed a component using direct metal laser sintering.

The non-contacting thermal support 140 illustrated in the example of FIG. 3 maintains the thermal pathway described above, but utilizes significantly less material to construct the non-contacting thermal support 140, thereby achieving a cost and materials savings relative to the example of FIG. 1.

With reference to FIGS. 1-3, in some examples, the specific dimensions of the non-contacting thermal support 40, 140 can be input into the controller 12, 112 along with the dimensions of the component 20 being assembled. In alternate examples the dimensions of the component 20 being assembled can be input into the controller 12, 112 and the dimension and features of the non-contacting thermal support 40, 140 can be determined by the controller 12, 112 based upon the dimensions of the component 20 being assembled.

Figure 4:
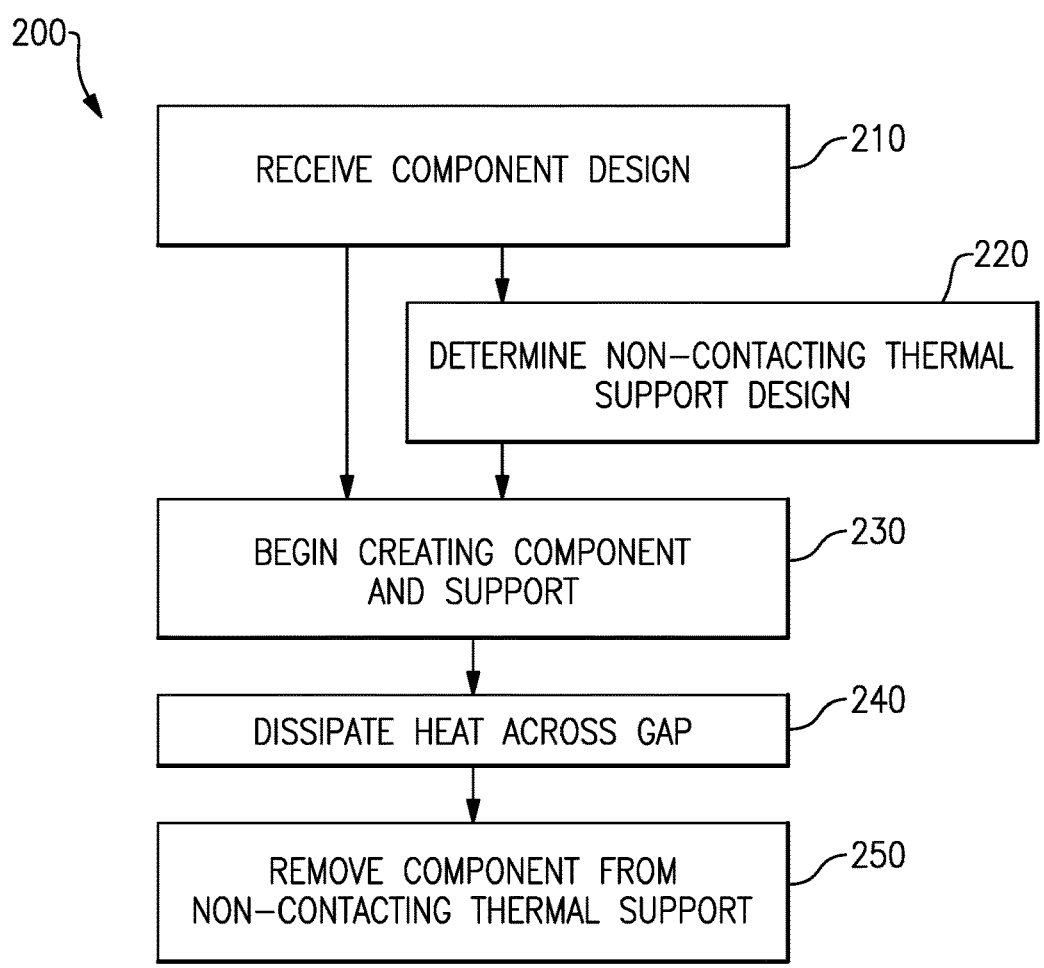
FIG. 4 illustrates a flowchart demonstrating an additive manufacturing process.

With continued reference to FIGS. 1 and 3, and with like numerals indicating like elements, FIG. 4 illustrates a flowchart 200 demonstrating an additive manufacturing process including a non-contacting thermal support. Initially a component design is input to a controller 12, 112 of an additive manufacturing machine 10, 110 at a "receive component design" block 210. In some examples, a design for a corresponding non-contacting thermal support 40, 140 is input to the controller 12, 112 simultaneous with the input of the component design. In alternative examples, the controller 12, 112 determines a design for the non-contacting thermal support 40, 140 based on the design for the component at an optional "determine non-contacting thermal support design" block 220.

Once the controller 12, 112 has a design for both the component and the corresponding non-contacting thermal support, the controller 12, 112 causes the additive manufacturing machine 10, 110 to begin creating both the component 20, 120 and the non-contacting thermal support 40, 140 simultaneously at a "begin creating component and support" block 230.

As the component 20, 120 and the non-contacting thermal support 40, 140 are created, the gap 50, 150 is defined between the component 20, 120 and inwardly facing surfaces of the non-contacting thermal support 40, 140. As described above, due to the small nature of the gap, heat can traverse the gap into the non-contacting thermal support 40, 140 in an efficient manner. As a result of this arrangement, heat is dissipated across the gap 50, 150 into the non-contacting thermal support 40, 140 at a "dissipate heat across gap" block 240.

Due to the non-contacting nature of the non-contacting thermal support 40, 140, the heat dissipation effect can be provided even at inaccessible downward facing surfaces, or other similar surfaces where an integral thermal and structural support would be improper. The ability to dissipate heat across the gap 50, 150 allows these surfaces to include a smoother finish that has minimal, or no, heat artifacts.

Once assembly of the component 20, 120 and the non-contacting thermal support 40, 140 has been completed, the component 20, 120 is removed from the non-contacting thermal support 40, 140 at a "remove component from non-contacting thermal support" block 250. Because the non-contacting thermal support 40, 140 does not having any physical contact with the component 20, 120, the component 20, 120 can be simply removed by hand, eliminating the majority of support removal processes and finishing steps required in existing systems. As the component 20, 120 can be removed from the non-contacting thermal support 40, 140 by hand, no mechanical or chemical alterations to the non-contacting thermal support 40, 140 need to be made to facilitate the removal.

While illustrated herein as a relative simple geometric shape, one of skill in the art will understand that the above principles and operations can be applied to shapes and components of significant complexity with minimal adaption to the above described process. Further, one of skill in the art will understand that the utilization of the non-contacting thermal support 40, 140 can be limited to only areas and surfaces of the component 20, 120 that require additional heat dissipation during the assembly process. In such an example the mold structure created by the non-contacting thermal support 40, 140 is a partial mold.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. An additive manufacturing process comprising:
   simultaneously constructing a component and a non-contacting thermal support for said component by constructing at least one downward facing surface of said component and at least one upward facing surface of said non-contacting thermal support such that a gap is defined between the at least one upward facing surface and the at least one downward facing surface, and wherein said at least one downward facing surface is opposite said at least one upward facing surface across said gap, the downward facing surface having an angle of approximately horizontal relative to gravity, wherein the non-contacting thermal support includes a three dimensional negative of the component, and wherein said gap is in the range of about three to five times an average particle size of a powder particle utilized in said additive manufacturing process; and
   dissipating heat from said component through said non-contacting thermal support to a heat sink.

2. The additive manufacturing process of claim 1, wherein dissipating heat from said component through said non-contacting thermal support to a heat sink comprises providing a thermal passage across the gap.

3. The additive manufacturing process of claim 1, further comprising constructing said thermal support as a solid component.

4. The additive manufacturing process of claim 1, further comprising constructing said thermal support as a thermally conductive wall supported by a structural support.

5. The additive manufacturing process of claim 1, further comprising removing said component from said non-contacting thermal support without mechanically altering said non-contacting thermal support and without chemically altering said non-contacting thermal support.

6. The additive manufacturing process of claim 1, wherein simultaneously constructing a component and a non-contacting thermal support for said component comprises constructing each of said component and said non-contacting thermal support using a direct metal laser sintering process.

* * * * *